(12) United States Patent
Yoshitake et al.

(10) Patent No.: US 6,706,778 B2
(45) Date of Patent: Mar. 16, 2004

(54) PROCESS FOR THE PRODUCTION OF MOLDED PARTICLES FOR MICROBIAL CELL-IMMOBILIZATION

(75) Inventors: Junya Yoshitake, Hiratsuka (JP); Kenji Miyagawa, Hiratsuka (JP); Kenji Seko, Yokosuka (JP)

(73) Assignee: Kansai Paint Co., Ltd., Kyogo-ken (JP)

( * ) Notice: Subject to any disclaimer, the term of this patent is extended or adjusted under 35 U.S.C. 154(b) by 196 days.

(21) Appl. No.: 10/059,309

(22) Filed: Jan. 31, 2002

(65) Prior Publication Data

US 2002/0143104 A1 Oct. 3, 2002

(30) Foreign Application Priority Data

Jan. 31, 2001 (JP) ........................................ 2001-023468

(51) Int. Cl.[7] .................................................. C08F 2/46
(52) U.S. Cl. .............................. 522/84; 522/86; 522/87; 522/88; 522/89; 522/90; 522/97; 522/96; 527/301; 527/312; 527/313; 527/314; 435/174; 435/182; 424/484; 424/486; 424/488; 424/489; 424/490; 424/493; 424/497; 424/499
(58) Field of Search .............................. 522/84, 86, 85, 522/87, 88, 89, 90, 97, 96; 527/301, 312, 313; 424/484, 486, 488, 489, 490, 493, 497, 499

(56) References Cited

U.S. PATENT DOCUMENTS

| | | | |
|---|---|---|---|
| 4,195,129 A | * 3/1980 | Fukui et al. | 435/182 |
| 4,605,622 A | 8/1986 | Hasegawa et al. | |
| 4,666,984 A | * 5/1987 | Carlick et al. | 525/131 |
| 5,700,848 A | * 12/1997 | Soon-Shiong et al. | 522/7 |
| 5,705,270 A | * 1/1998 | Soon-Shiong et al. | 428/402.2 |
| 5,837,747 A | * 11/1998 | Soon-Shiong et al. | 522/26 |
| 5,846,530 A | * 12/1998 | Soon-Shiong et al. | 424/93.7 |
| 5,990,191 A | * 11/1999 | Kikuta et al. | 522/87 |

FOREIGN PATENT DOCUMENTS

| | | |
|---|---|---|
| JP | 62-19837 | 5/1987 |
| JP | 10-210969 | 8/1998 |
| JP | 2000-139458 | 5/2000 |
| JP | 2001-205286 | 7/2001 |
| JP | 2001-252073 | 9/2001 |

* cited by examiner

Primary Examiner—James J. Seidleck
Assistant Examiner—Sanza L McClendon
(74) Attorney, Agent, or Firm—Wenderoth, Lind & Ponack, L.L.P.

(57) ABSTRACT

This invention provides a process for the production of molded particles for microbial cell-immobilization which is characterized in that:

an aqueous liquid composition which comprises:
  (a) an ethylenically unsaturated group-containing urethane resin which is obtained by making a tertiary amino group-containing diol react with a polyisocyanate compound, and by further introducing an ethylenically unsaturated group;
  (b) a polymerization initiator; and
  (c) water-soluble macromolecular polysaccharides;
is gelatinized, in an aqueous medium which contains metal ion, to be particulate gel which is then subjected to photopolymerization and/or thermopolymerization by which to cause the crosslinking reaction of ethylenically unsaturated group in said particulate gel.

26 Claims, No Drawings

PROCESS FOR THE PRODUCTION OF MOLDED PARTICLES FOR MICROBIAL CELL-IMMOBILIZATION

BACKGROUND OF THE INVENTION

1. Field of the Invention

This invention relates to a process for the production of molded particles for microbial cell-immobilization.

2. Description of the Prior Arts

There have been known various methods to immobilize microorganisms, such as encapsulation method, physical adsorption method and covalent bond method. Lump-like or sheet-like immobilized matters which are produced by these methods are usually cut or crushed fine before they are applied to microbial reaction. In these cases, however, immobilized matters often adhere to one another at the face, which decreases the efficiency of microbial reaction. On this account, it has recently been proposed to immobilize microorganism cells in the form of molded particles so that they may have less contact area and therefore be readily flowable, and to thereby increase the efficiency of microbial reaction [e.g., Japanese Patent Publication No. Sho 62 (1987)-19837, Japanese Patent Application Laid-Open No. Hei 10 (1998)-2109691].

Conventional molded particles for microbial cell-immobilization which comprise photocurable resin or thermocurable resin as a main component have, however, had a problem that, owing to their poor adhesiveness to the cell of negatively-charged microorganisms such as genus Pseudomonas, genus Paracoccus and genus Nitrosomonas, these conventional molded particles give only insufficient biological activity. Hence, improvement in this problem has been desired.

It is the primary objective of this invention to provide molded particles for microbial cell-immobilization which have improved adhesiveness to microbial cells.

As a result of assiduous study in order to attain the above-mentioned objective, the inventors of this invention have now found out that the adhesiveness of microbial cells to particulate carrier can be markedly improved by using, as a constituent material for particulate carrier for immobilization, a novel hydrophilic urethane resin which is prepared by making tertiary amino group-containing diol react with polyisocyanate compound, and further by introducing two or more ethylenically unsaturated groups. Thus, the inventors have completed this invention.

SUMMARY OF THE INVENTION

According to one aspect of this invention, there is provided a process for the production of molded particles for microbial cell-immobilization which is characterized in that:
an aqueous liquid composition which comprises:
(a) an ethylenically unsaturated group-containing hydrophilic urethane resin which is obtained by making tertiary amino group-containing diol (i), which is selected from the group consisting of product (i-1) from a reaction between a diglycidyl compound and a secondary amine which is free of hydroxyl group and product (i-2) from a reaction between a monoglycidyl compound and a secondary amine which has hydroxyl group, react with polyisocyanate compound (ii) so that isocyanate group may exceed hydroxyl group in said diol (i), and further by making thus produced isocyanate group-containing urethane resin (iii) react with compound (v) which has both ethylenically unsaturated group and hydroxyl group;
(b) a polymerization initiator; and
(c) water-soluble macromolecular polysaccharides which are capable of gelation by contact with metal ion;
is gelatinized, in an aqueous medium which contains metal ion, to be particulate gel, which is then subjected to photopolymerization and/or thermopolymerization by which to cause the crosslinking reaction of ethylenically unsaturated group in said particulate gel.

According to another aspect of this invention, there is provided a process for the production of molded particles for microbial cell-immobilization which is characterized in that:
an aqueous liquid composition which comprises:
(a) an ethylenically unsaturated group-containing hydrophilic urethane resin which is obtained by making tertiary amino group-containing diol (i), which is selected from the group consisting of product (i-1) from a reaction between a diglycidyl compound and a secondary amine which is free of hydroxyl group and product (i-2) from a reaction between a monoglycidyl compound and a secondary amine which has hydroxyl group, react with polyisocyanate compound (ii) so that hydroxyl group in said diol (i) may exceed isocyanate group in said polyisocyanate compound (ii), and further by making thus produced hydroxyl group-containing urethane resin (iv) react with compound (vi) which has both ethylenically unsaturated group and isocyanate group;
(b) a polymerization initiator; and
(c) water-soluble macromolecular polysaccharides which are capable of gelation by contact with metal ion;
is gelatinized, in an aqueous medium which contains metal ion, to be particulate gel, which is then subjected to photopolymerization and/or thermopolymerization by which to cause the crosslinking reaction of ethylenically unsaturated group in said particulate gel.

In the following, the process of this invention for the production of molded particles for microbial cell-immobilization is explained in more detail.

DETAILED DESCRIPTION OF THE INVENTION

The molded particles of this invention are produced as follows: an aqueous liquid composition which comprises, as essentially components, (a) a hydrophilic urethane resin, (b) a polymerization initiator and (c) water-soluble macromolecular polysaccharides, is dripped or poured into an aqueous medium which contains metal ion, and is thus gelatinized to be particulate gel, which is then subjected to photopolymerization and/or thermopolymerization by which to cause the reaction and curing of ethylenically unsaturated group in said particulate gel.

Hydrophilic Urethane Resin (a)

The hydrophilic urethane resin which is component (a) in the above-mentioned aqueous liquid composition is an ethylenically unsaturated group-containing hydrophilic urethane resin which is obtained by making a tertiary amino group-containing diol (i), which is selected from the group consisting of product (i-1) from a reaction between a diglycidyl compound and a secondary amine which is free of hydroxyl group and product (i-2) from a reaction between a monoglycidyl compound and a secondary amine which has hydroxyl group, react with polyisocyanate compound (ii), and further by making thus produced isocyanate group-containing urethane resin (iii) or hydroxyl group-containing urethane resin (iv) react with compound (v) which has both ethylenically unsaturated group and hydroxyl group, or with compound (vi) which has both ethylenically unsaturated group and isocyanate group.

First, from a reaction, which is to be conducted by any known method, either between diglycidyl compound and a secondary amine which is free of hydroxyl group, or between monoglycidyl compound and a secondary amine which has hydroxyl group, there is obtained reaction product (i-1) or (i-2) each of which has a tertiary amino group and two hydroxyl groups in a molecule, i.e., tertiary amino group-containing diol (i).

Diglycidyl compound which is used for the production of reaction product (i-1) is a compound which has, in a molecule, two glycidyl groups as follows:

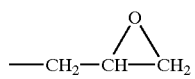

As examples of such a compound, there are mentioned diglycidyl ether compounds and alicyclic diglycidyl compounds. Examples of diglycidyl ether compounds include diglycidyl ether of bisphenols such as bisphenol A, bisphenol F and bisphenol S; and diglycidyl ether of alkylene glycols (preferably $C_2$–$C_9$ alkylene glycols) or of polyalkylene glycols (preferably $C_2$–$C_3$ polyalkylene glycols), such as neopentyl glycol diglycidyl ether, 1,6-hexanediol diglycidyl ether, ethyleneglycol diglycidyl ether, diethyleneglycol diglycidyl ether, polyethyleneglycol diglycidyl ether, propyleneglycol diglycidyl ether, dipropyleneglycol diglycidyl ether and polypropyleneglycol diglycidyl ether. As products of these compounds on the market, there are mentioned EPOLEAD NT212, EPOLEAD NT214, EPOLEAD NT228 and EPOLEAD CDM manufactured by Daicel Chemical Industries, Ltd., and DENACOL EX-201, DENACOL EX-211, DENACOL EX-212, DENACOL EX-810, DENACOL EX-811, DENACOL EX-850, DENACOL EX-851, DENACOL EX-821, DENACOL EX-830, DENACOL EX-832, DENACOL EX-841, DENACOL EX-861, DENACOL EX-911, DENACOL EX-941, DENACOL EX-920, DENACOL EX-921, DENACOL EX-931, DENACOL EX-992, DENACOL EX-701, DENACOL EX-721, DENACOL EX-203 and DENACOL EX-711 manufactured by Nagase Chemtex Corporation.

Examples of alicyclic diglycidyl compounds include diglycidyl to ether of bisphenols hydride such as bisphenol A hydride, bisphenol F hydride and bisphenol S hydride, which are however not restrictive. These compounds may be used either separately or in combination of two or more species.

Especially preferable diglycidyl compounds are ethyleneglycol diglycidyl ether, diethyleneglycol diglycidyl ether and polyethyleneglycol diglycidyl ether which has a number average molecular weight up to 1,000.

Examples of secondary amine free of hydroxyl group which is to be made to react with diglycidyl compound include dialkylamine, preferably di-$C_1$–$C_{18}$ alkylamine, such as dimethylamine, di-ethylamine, dipropylamine, dibutylamine, di-2-ethylhexylamine; diallylamine; alicyclic amine such as pyrrolidine, piperidine and morpholine, which are however not restrictive. These compounds may be used either separately or in combination of two or more species.

Monoglycidyl compound which is used for the production of reaction product (i-2) is a compound which has a glycidyl group in a molecule. As concrete examples of such a compound, there are mentioned glycidyl methacrylate, 2-methylglycidyl methacrylate, allylglycidyl ether and phenylglycidyl ether, and AOEX24, AOEX68, CYCLOMER M100, CYCLOMER A-200 and CELOXIDE 2000 manufactured by Daicel Chemical Industries, Ltd., and DENACOL EX-121, DENACOL EX-145, DENACOL EX-146 and DENACOL EX-171 manufactured by Nagase Chemtex Corporation, which are however not restrictive. These compounds may be used either separately or in combination of two or more species. Especially suitable among these compounds are those which have both glycidyl group and ethylenically unsaturated group, such as glycidyl methacrylate, 2-methylglycidyl methacrylate and allylglycidyl ether.

Examples of secondary amine having hydroxyl group which is to be made to react with monoglycidyl compound include N-alkylalkanol amine, preferably N-$C_1$–$C_4$ alkyl $C_1$–$C_4$ alkanol amine, such as N-methylethanolamine, N-ethylethanolamine, N-n-butylethanolamine and N-t-butylethanolamine, which are however not restrictive. These compounds may be used either separately or in combination of two or more species.

Reaction between a diglycidyl compound and a secondary amine which is free of hydroxyl group, or between a monoglycidyl compound and a secondary amine which has hydroxyl group, may be conducted by any known method, for instance, either without solvent or in a suitable organic solvent (e.g., toluene and xylene), at a temperature of about 20 to about 120° C. The proportion of the above-mentioned secondary amine to di- or mono-glycidyl compound in such a reaction is not restrictive. Generally, however, secondary amine which is free of hydroxyl group is preferably used in an amount within a range of 1.7 to 2.3 moles, in particular 1.9 to 2.1 moles, per mole of diglycidyl compound. Secondary amine which has hydroxyl group, on the other hand, is preferably used in an amount within a range of 0.8 to 1.2 moles, in particular 0.9 to 1.1 moles, per mole of monoglycidyl compound.

Next, polyisocyanate compound (ii) is made to react with hydroxyl group of the compound produced from the above-mentioned reaction which has a tertiary amino group and two hydroxyl groups in a molecule, i.e., tertiary amino group-containing diol (i), and, thus, there is produced a urethane resin.

Polyisocyanate compound (ii) which is used in the above-mentioned reaction is a compound which has two or more isocyanate groups in a molecule. Examples of such a compound include tolylene diisocyanate, 4,4'-diphenylmethane diisocyanate, xylylene diisocyanate, hexamethylene diisocyanate, lysine diisocyanate, 4,4'-methylene-bis-(cyclohexylisocyanate), methylcyclohexane-2,4 (or 2,6)-diisocyanate, 1,3-(isocyanatemethyl)cyclohexane, isophoron diisocyanate, trimethylhexamethylene diisocyanate, dimer acid diisocyanate, dianisidine diisocyanate, phenyl diisocyanate, halophenyl diisocyanate, methylene diisocyanate, ethylene diisocyanate, butylene diisocyanate, propylene diisocyanate, octadecylene diisocyanate, 1,5-naphthalene diisocyanate, polymethylene polyphenylene diisocyanate, triphenylmethane triisocyanate, naphthalene diisocyanate, polymer of tolylene diisocyanate, polymer of diphenylmethane diisocyanate, polymer of hexamethylene diisocyanate, 3-phenyl-2-ethylene diisocyanate, (umene-2, 4-diisocyanate, 4-methoxy-1,3-phenylene diisocyanate, 4-ethoxy 1,3-phenylene diisocyanate, 2,4'-diisocyanate diphenylether, 5,6-dimethyl-1,3-phenylene diisocyanate, 4,4'-diisocyanate diphenylether, benzidine diisocyanate, 9,10-anthracene diisocyanate, 4,4'-diisocyanate benzyl, 3,3'-dimethyl-4,4'-diisocyanate diphenylmethane, 2,6-dimethyl-4,4'-diisocyanate diphenyl, 3,3'-dimethoxy-4,4'-diisocyanate diphenyl, 1,4-anthracene diisocyanate, phenylene diisocyanate, 2,4,6-tolylene triisocyanate, 2,4,4'-triisocyanate diphenylether, 1,4-tetramethylene diisocyanate, 1,6-hexamethylene diisocyanate, 1,10-decamethylene diisocyanate and 1,3-cyclohexylene diisocyanate, which are however not restrictive. These compounds may be used either separately or in combination of two or more species.

Especially suitable among these polyisocyanate compounds (ii) are tolylene diisocyanate, 4,4'-diphenylmethane diisocyanate, xylylene diisocyanate, hexamethylene diisocyanate, isophoron diisocyanate, trimethylhexamethylene diisocyanate and dimer acid diisocyanate.

Reaction between tertiary amino group-containing diol (i) and polyisocyanate compound (ii) may be conducted by any known method for urethane reaction, for instance, either without solvent or in a suitable organic solvent (e.g., toluene and xylene), at a temperature of about 20 to about 120° C.

The proportion of polyisocyanate compound (ii) to tertiary amino group-containing diol (i) may be varied depending on which is desired, isocyanate group-containing urethane resin (iii) or hydroxyl group-containing urethane resin (iv). When the former, i.e., isocyanate group-containing urethane resin (iii), is desired, polyisocyanate compound (ii) is used in such a manner that isocyanate group may exceed hydroxyl group in tertiary amino group-containing diol (i), or, for example, in such a manner that NCO/OH equivalent ratio may fall within a range of 1.2 to 2. When the latter, i.e., hydroxyl group-containing urethane resin (iv), is desired, tertiary amino group-containing diol (i) is used in such a manner that hydroxyl group may exceed isocyanate group) in polyisocyanate compound (ii), or, for example, in such a manner that OH/NCO equivalent ratio may fall within a range of 1.2 to 2.

In the above-mentioned production of urethane resin, a part of tertiary amino group-containing diol (i), e.g., up to 3000%, preferably up to 1000%, by weight of said diol (i), may be replaced with polyol which contains no tertiary amino group.

Examples of the above-mentioned polyol include ethylene glycol, diethylene glycol, triethylene glycol, propylene glycol, dipropylene glycol, polyethylene glycol (molecular weight: at most 6,000), trimethylene glycol, polypropylene glycol (molecular weight: at most 6,000), tetramethylene glycol, polytetramethylene glycol, 1,2-butylene glycol, 1,3-butanediol, 1,4-butanediol, 1,5-pentanediol, neopentyl glycol, 1,2-hexylene glycol, 1,6-hexane diol, heptane diol, 1,10-decane diol, cyclohexane diol 2-butene-1,4-diol, 3-cyclohexene-1,1-dimethanol, 4-methyl-3-cyclohexene-1,1-dimethanol, 3-methylene-1,5-pentanediol, (2-hydroxyethoxy)-1-propanol, 4-(2-hydroxyethoxy)-1-butanol, 5-(2-hydroxyethoxy)-pentanol, 3-(2-hydroxypropoxy)-1-propanol, 4-(2-hydroxypropoxy)-1-butanol, 5-(2-hydroxypropoxy)-1-pentanol, 1-(2-hydroxyethoxyl)-2-butanol, 1-(2-hydroxyethoxy)-2-pentanol, dimethylolpropionate, dimethylolbutanoate, dimethylolvalerate, bispherol A hydride, glycerin, polycaprolactone, 1,2,6-hexane triol, trimethylol propane, trimethylol ethane, pentanetriol, tris(hydroxymethyl)aminomethane, 3-(2-hydroxyethoxy)-1,2-propane diol, 3-(2-hydroxypropoxy)-1,2-propane diol, 6-(2-hydroxyethoxy)-1,2-hexane diol, pentaerythritol, dipentaerythritol, mannitol and glucose. In particular suitable are diethylene glycol, triethylene glycol and polyethylene glycol (molecular weight: at most 6,000) in view of hydrophilicity and strength.

Thus produced isocyanate group-containing urethane resin (iii) is further made to react with compound (v) which has both ethylenically unsaturated group and hydroxyl group, while thus produced hydroxyl group-containing urethane resin (iv) is further made to react with compound (vi) which has both ethylenically unsaturated group and isocyanate group. In this manner, there is obtained (a) an ethylenically unsaturated group-introduced hydrophilic urethane resin.

Examples of the above-mentioned compound (v) which has both ethylenically unsaturated group and hydroxyl group include hydroxyalkyl(meth)acrylate such as 2-hydroxyethylacrylate, 2-hydroxyethyl methacrylate, 3-hydroxypropylacrylate, 3-hydroxypropylmethacrylate, 2-hydroxypropylacrylate, 2-hydroxypropylmethacrylate, butanediol monoacrylate, butanediol monomethacrylate; ethylenically unsaturated alcohol such as allyl alcohol and crotyl alcohol; and N-alkanol(meth)acrylamide such as N-methylolacrylamide. Furthermore, there can be used an adduct of glycidylacrylate or glycidylmethacrylate with carboxyl group-containing compound (e.g., adipic acid, sebacic acid and azelaic acid) or an adduct of acrylic acid or methacrylic acid with epoxy compound (e.g., epichlorohydrin). These compounds may be used either separately or in combination of two or more species.

Especially suitable among the above compounds are 2-hydroxyethyl acrylate, 2-hydroxyethyl methacrylate, 3-hydroxypropylacrylate, 3-hydroxypropylmethacrylate, 2-hydroxypropylacrylate and 2-hydroxypropylmethacrylate.

Examples of compound (vi) which has both ethylenically unsaturated group and isocyanate group include ethylmethacrylate isocyanate and an adduct (e.g., a mono adduct of isophorone diisocyanate with hydroxyethyl methacrylate) which is prepare by adding a compound which has both hydroxyl group and ethylenically unsaturated group such as the above-mentioned hydroxyalkyl(meth)acrylate, to one isocyanate group of diisocyanate compound. Especially suitable in these compounds is ethylmethacrylate isocyanate.

Both reaction between isocyanate group-containing urethane resin (iii) and compound (v) which has both ethylenically unsaturated group and hydroxyl group, and reaction between hydroxyl group-containing urethane resin (iv) and compound (vi) which has both ethylenically unsaturated group and isocyanate group, are a urethane bond-formation reaction between hydroxyl group and isocyanate group, which may be conducted either without solvent or in a suitable organic solvent (e.g., toluene and xylene), at a temperature of about 40 to about 120° C.

The proportion of compound (v) which has both ethylenically unsaturated group and hydroxyl group to isocyanate group-containing urethane resin (iii), and the proportion of compound (vi) which has both ethylenically unsaturated group and isocyanate group to hydroxyl group-containing urethane resin (iv) are each preferably determined so that NCO/OH equivalent ratio may fall within a range of 0.8 to 1.

Urethane resin (a) which is produced in the above-mentioned manner may have, in one molecule, at least 1.5, desirably at least 2, especially desirably 2 to 5, ethylenically unsaturated groups, and have generally a number average molecular weight within a range of 400 to 50,000, in particular 500 to 30,000, much desirably 1,000 to 20,000, and preferably have an equivalent of ethylenically unsaturated group (number average molecular weight/number of ethylenically unsaturated groups in one molecule) of 50 to 35,000, especially 200 to 10,000.

It is preferable that urethane resin (a) has suitable hydrophilicity, and is capable of dispersing uniformly in aqueous medium. As circumstances may demand, hydrophilicity can be enhanced by introducing, into urethane resin (a), ionic or nonionic hydrophilic group such as hydroxyl group, amino group, carboxyl group, phosphoric group, sulfonic group and ether bond. Among these, ether bond is most suitably introduced, since it can improve the hydrophilicity of urethane resin (a) without decreasing adhesiveness to microbial cells.

The introduction of ether bond can be conducted by replacing, in the production of urethane resin (a), a part of tertiary amino group-containing diol (i) with polyol having ether bond such as diethylene glycol, triethylene glycol polyethylene glycol (molecular weight: at most 6,000), dipropylene glycol and polypropylene glycol, preferably diethylene glycol, triethylene glycol and polyethylene glycol (molecular weight: at most 6,000).

Photopolymerization Initiator (b)

As polymerization initiator, i.e., component (b) in aqueous liquid composition, there are suitably employed photopolymerization initiator and/or redox type thermopolymerization initiator.

As photopolymerization initiator, any known ones can be used without particular restriction, examples of which include benzoin, benzoin methyl ether, benzoin ethyl ether, benzoin butyl ether, diethoxy acetophenone, 2-hydroxy-2-methyl-1-phenylpropan-1-one, benzylmethylketal, 1-hydroxycyclohexyl-phenylketone, 2-methyl-2-morpholino(4-thiomethylphenyl)propan-1-one, 2-benzyl-2-dimethylamino-1-(4-morpholinophenyl)-butanone, 2,4,6-trimethylbenzoyldiphenylphosphine oxide, 2,4,6-trimethylbenzoyldiphenylethoxyphosphine oxide, benzophenone, methyl o-benzoylbenzoate, hydroxybenzophenone, 2-isopropylthioxantone, 2,4-dimethylthioxantone, 2,4-diethylthioxantone, 2,4-dichlorothioxantone, 2,4,6-tris(trichloromethyl)-S-triazine, 2-methyl-4,6-bis(tricloro)-S-triazine and 2-(4-methoxyphenyl)-4,6-bis(trichloromethyl)-S-triazine. These compounds may be used either separately or in combination of two more species.

With a view to accelerating photopolymerization reaction which is caused by these photopolymerization initiator, photosensitization accelerator may be employed together with photopolymerization initiator. Examples of usable photosensitization accelerator include tertiary amino group type ones such as triethylamine, triethanolamine, methyldiethanolamine, 4-dimethylamino isoamylbenzoate, (2-dimethylamino)ethylbenzoate, Michler's ketone and 4,4'-diethylaminobenzophenone; alkylphosphine type ones such as triphenylphosphine; and thioether type ones such as β-thioglycol. These photosensitization accelerators may be used either separately or in combination of two or more species.

As redox type thermopolymerization initiator, any known ones can be used. Suitably usable one is a polymerization initiator which is composed of oxidizing agent and reducing agent, and which is capable of causing radical polymerization at a comparatively low temperature of −10° C.~50° C.

Examples of oxidizing agent include organic peroxides such as benzoyl peroxide, methylethylketone peroxide, dicumyl peroxide, t-butyl perbenzoate and cumene hydroperoxide; peroxodisulfate such as ammonium peroxodisulfate and potassium peroxodisulfate; and hydrogen peroxide.

Examples of reducing agent include hydrogensulfites such as sodium hydrogensulfite; divalent iron salts such as ferrous sulfate and ferrous chloride; amines such as N,N-dimethylaniline and phenylmorpholine; and metal salts of naphthenic acid such as cobalt naphthenate, manganese naphthenate and copper naphthenate.

Redox type thermopolymerization initiator is used as a combination of oxidizing agent and reducing agent. These two components are suitably mixed in a molar ratio within a range of 5:1~1:5, preferably 2.5:1~1:2.5. Photopolymerization initiator and redox type thermopolymerization initiator may be used in combination.

Water-soluble Macromolecular Polysaccharides (c)

Water-soluble macromolecular polysaccharides which are to be used in this invention are macromolecular polysaccharides which are capable of changing into gel either insoluble or hardly soluble in water when brought into contact with metal ion in an aqueous medium, and which, in general, have a number average molecular weight in a range of about 3,000 to 2,000,000, especially 5,000 to 200,000, and which usually show a solubility of at least about 10 g/l (25° C.), especially at least about 20 g/l (25° C.), in a water-soluble state before brought into contact with metal ion.

Examples of water-soluble macromolecular polysaccharides which have such properties include alkali metal salt of alginic acid and carageenan. These water-soluble macromolecular polysaccharides are, in a state as dissolved in an aqueous medium, capable of gelation by contact, in the case of carageenan, with alkali metal ion such as potassium ion or sodium ion, or, in the case of alkali metal salt of alginic acid, by contact with at least one polyvalent metal ion such as magnesium ion, calcium ion, strontium ion, barium ion, aluminum ion, cerium ion and nickel ion. The concentration of alkali metal ion or polyvalent metal ion at which gelation occurs differs depending on the species of water-soluble macromolecular polysaccharides etc. Generally, however, the concentration of these metal ions is in a range of 0.01 to 5 mol/l, in particular 0.1 to 1 mol/l. These water-soluble macromolecular polysaccharides may be used either separately or in combination of two or more species.

Aqueous Liquid Composition

Aqueous liquid composition can be prepared by mixing the above-mentioned urethane resin (a), polymerization initiator (b) and water-soluble macromolecular polysaccharides (c). The proportion among the above-mentioned components (a), (b) and (c) is not strictly restricted, but may be varied widely according to the species of the components. Generally, however, components (b) and (c) are preferably used in the following ratio based on 100 parts by weight of urethane resin (a):

| | |
|---|---|
| Polymerization initiator (b): | 0.1 to 10 parts by weight (preferably 0.3 to 7 parts by weight, in particular 0.5 to 5 parts by weight) |
| Water-soluble macromolecular polysaccharides (c): | 0.5 to 15 parts by weight (preferably 1 to 10 parts by weight, in particular 2 to 5 parts by weight). |

Molded particles which are produced from an aqueous liquid composition which in turn is formed substantially only from the above-mentioned urethane resin (a), polymerization initiator (b) and water-soluble macromolecular polysaccharides (c) have generally a specific gravity of 1.00 to 1.03, i.e., almost the same as that of water. The specific gravity can, however, be adjusted to any desired value by means of adding a specific gravity adjustor such as pigment and hollow particles. When specific gravity is desired to be increased, a specific gravity adjustor which have a specific gravity of 1 or more such as glass beads, talc, mica and baryta is added in an amount of 0.1 to 50 parts by weight per 100 parts by weight of the above-mentioned urethane resin (a), so that molded particles may have a specific gravity within a range of 1.00 to 1.25. When, on the other hand, specific gravity is desired to be decreased, a specific gravity adjustor such as hollow glass beads, hollow Celite and hollow polymer which have a specific gravity of 1 or less is added in an amount of 0.1 to 30 parts by weight per 100 parts by weight of the above-mentioned urethane resin (a), so that molded particles may have a specific gravity within a range of 0.90 to 1.00.

The above-mentioned components (a), (b) and (c), and a specific gravity adjustor which is to be added as circumstances may demand, are dissolved or dispersed in an aqueous medium, and, thus, an aqueous liquid composition is prepared. The solid content of this aqueous liquid composition is suitably within a range of 5 to 30% by weight.

When redox type thermopolymerization initiator is used as a polymerization initiator, both an oxidizing agent; and a reducing agent may simultaneously be included in aqueous liquid composition. It is also acceptable, however, to include only one of oxidizing agent and reducing agent in aqueous liquid composition, while including the other in a metal ion-containing aqueous medium in a concentration of 0.05 to 5% by weight, preferably 0.1 to 2% by weight.

Production of Molded Particles

Thus prepared aqueous liquid composition is then dripped into such a metal ion-containing aqueous medium as mentioned above. Otherwise, when it is desired to obtain particles whose average particle size is 5 mm or more, the aqueous liquid composition is poured onto the surface of said aqueous medium continuously for a predetermined time so that droplet may grow to a desired size, and, then, the droplet is precipitated. In this manner, said aqueous liquid composition is gelatinized into granule.

The dripping of aqueous liquid composition into a metal ion-containing aqueous medium is conducted by dripping said aqueous liquid composition from the tip of syringe, or by scattering said aqueous liquid composition in the form of granules with use of centrifugal force, or by atomizing, from the tip of spray nozzle, said aqueous liquid composition to be granulated and dripped. When, on the other hand, the aqueous liquid composition is to be poured onto the surface of said aqueous medium, it can be carried out by continuously supplying the aqueous liquid composition as a thin liquid stream from a nozzle of a desired bore. The size of droplets which are thus dripped may be varied optionally according to the particle size which is required of final particles for immobilization. Usually, however, it is convenient that the droplet has a diameter of about 0.1 mm to about 5 mm, preferably about 0.5 mm to about 4 mm. When the aqueous liquid composition is to be poured, on the other hand, the droplet has conveniently a diameter of about 0.5 mm to 3 mm.

Thus formed granular gel is, either in a state of dispersion in the aqueous medium or after separated from the aqueous medium, subjected to photopolymerization or thermopolymerization, and, thus, urethane resin in said granular gel can be cured The granular gel thereby makes molded particles for microbial cell-immobilization which are substantially insoluble in water and have large mechanical strength.

When the above-mentioned curing is to be conducted by means of photopolymerization, the wave length of active ray to be used differs according to the species of urethane resin which is contained in said granular gel. Generally, however, an illuminant which emits light having a wave length in a range of about 250 to about 600 nm, in particular 250 to 400 nm, is advantageously used. Examples of such an illuminant include low-pressure mercury lamp, high-pressure mercury lamp, fluorescent lamp, xenon lamp, carbon-arc lamp and sun light. Irradiation time needs to be changed according to the intensity of light from the illuminant and the distance from the illuminant. Generally, it may, be in a range of about 0.5 to about 10 minutes.

When the curing of urethane resin is carried out by thermopolymerization, granular gel, so long as it contains redox type thermopolymerization initiator, proceeds with thermopolymerization until necessary mechanical strength is obtained, if only, left to stand still at room temperature. Where appropriate, however, granular gel may be heat-cured. Curing temperature is preferably within a range of 0 to 50° C., in particular 20 to 40° C. In order that necessary mechanical strength may be achieved, it is desirable to spend at least 10 to 30 minutes for heat-curing.

Granular gel which has thus been subjected to photopolymerization and/or thermopolymerization is washed with water or aqueous buffer solution, and may be stored as it is, or after freeze dried.

The molded particles for microbial cell-immobilization which are produced by this invention have a surface structure which is especially suitable for the adhesion of microorganisms, and, therefore, allow a large amount microorganisms to adhere thereto. Both anaerobic and aerobic microorganisms are acceptable as microorganism to adhere to this carrier. Examples of such microorganisms include molds such as genus Aspergillus, genus Penicillium and genus Fusarium; yeasts such as genus Saccharomyces, genus Phaffia and genus Candida; bacteria such as genus Zymomonas, genus Pseudomonas, genus Nitrosomonas, genus Nitrobacter, genus Paracoccus, genus Vibrio, genus Methanosarcina and genus Bacillus. The molded particles which are produced by this invention achieve large effects especially in the improvement of adhesion to microorganisms such as genus Pseudomonas, genus Nitrosomonas, genus Nitrobacter and genus Paracoccus.

When urethane resin has a curing temperature as low as room temperature, the above-mentioned microorganisms may previously be mixed, for the sake of immobilization by encapsulation, in an aqueous liquid matter which is composed of components (a), (b) and (c).

Thus, the process of this invention for the production of molded particles for immobilization gives immobilizing particles which have large strength, and are excellent in adhesion to microbial cells. The molded particles which are provided by the process of this invention are also applicable to bioreactor and fermentation bath.

EXAMPLES

In the following, this invention is explained in more detail by working examples, which nevertheless do not restrict this invention. In the following Examples and Comparative Examples, "parts" and "%" are based on weight.

Production Example 1

A four-necked flask was fed with 3,000 parts of toluene, 142 parts of glycidylmethacrylate and 0.1 part of hydroquinone, which were stirred. To the resultant mixture, 75 parts of N-methylethanol amine was added dropwise with aeration over a period of one hour at a temperature of 110°

C. Said temperature was kept for eight hours for reaction and, thus, a solution of amine-containing diol was obtained. To this solution, 2,000 parts of polyethylene glycol (average molecular weight: about 1,000) and 888 parts of isophorone diisocyanate were added and stirred with further aeration, and, then, the resulting mixture was maintained at 100° C. for eight hours for reaction, and, thus, an isocyanate group-containing urethane resin was obtained. Furthermore, 232 parts of 2-hydroxyethyl acrylate was introduced into reactor, and the resultant mixture was allowed to react at 80° C. for three hours with aeration. After it was confirmed that almost no isocyanate group remained, 5,000 parts of deionized water was added, and, then, pressure in the interior of reaction bath was reduced by vacuum pump at 70° C. for one hour so that toluene might be removed, and, thus, there was obtained aqueous solution (A) of ethylenically unsaturated group-containing urethane resin having a solid content of about 40%. Said resin had a number average molecular weight of 3,300, and contained, on average, about three ethylenically unsaturated groups per molecule.

Production Example 2

A four-necked flask was fed with 1,800 parts of toluene, 520 parts of DENACOL EX-830 (diglycidylether compound manufactured by Nagase Chemtex Corporation), to which, with stirring, 258 parts of dibutylamine was added dropwise over a period of one hour at a temperature of 110° C. Said temperature was kept for eight hours for reaction, and, thus, a solution of amine-containing diol was obtained To this solution, 1,200 parts of polyethylene glycol (average molecular weight: about 600) and 348 parts of 2,4-tolylene diisocyanate were added and stirred, and, then, the resulting mixture was maintained at 100° C. for eight hours for reaction, and, thus, a hydroxyl group-containing urethane resin was obtained Furthermore, 310 parts of ethylmethacrylate isocyanate and 2 parts of hydroquinone were introduced into reactor, and the resultant mixture was allowed to react at 80° C. for three hours with aeration. After it was confirmed that almost no isocyanate group remained, 4,000 parts of deionized water was added, and, then, pressure in the interior of reaction bath was reduced by vacuum pump at 70° C. for one hour so that toluene might be removed, and, thus, there was obtained aqueous solution (B) of ethylenically unsaturated group-containing urethane resin having a solid content of about 40%. Said resin had a number average molecular weight of 2,600, and contained, on average, about two ethylenically unsaturated groups per molecule.

Production Example 3

A four-necked flask was fed with 1,000 parts of toluene, 1,215 parts of DENACOL EX-145 (monoglycidyl compound manufactured by Nagase Chemtex Corporation), to which, with stirring, 225 parts of N-methylethanol amine was added dropwise over a period of one hour at a temperature of 110° C. Said temperature was kept for eight hours for reaction, and, thus, a solution of amine-containing diol was obtained To this solution, 888 parts of isophorone diisocyanate was added and stirred, and, then, the resulting mixture was maintained at 100° C. for eight hours for reaction, and, thus, an isocyanate group-containing urethane resin was obtained. Furthermore, 232 parts of 2-hydroxyethyl acrylate and 2 parts of hydroquinone were introduced into reactor, and the resultant mixture was allowed to react at 80° C. for three hours with aeration. After it was confirmed that almost no isocyanate group remained, 3,900 parts of deionized water was added, and, then, pressure in the interior of reaction bath was reduced by vacuum pump at 70° C. for one hour so that toluene might be removed, and, thus, there was obtained aqueous solution (C) of ethylenically unsaturated group-containing urethane resin having a solid content of about 40%. Said resin had a number average molecular weight of 2,600, and contained, on average, about two ethylenically unsaturated groups per molecule.

Comparative Production Example 1

A four-necked flask was fed with 700 parts of toluene, 2,000 parts of polyethylene glycol (average molecular weight: about 2,000) and 444 parts of isophorone diisocyanate, and, then, the resultant mixture was stirred, and was allowed to react at 80° C. for two hours, and, thus, an isocyanate group-containing urethane resin was obtained. Furthermore, 232 parts of 2-hydroxyethyl acrylate and 2 parts of hydroquinone were introduced into reactor, and the resultant mixture was allowed to react at 80° C. for three hours with aeration. After it was confirmed that almost no isocyanate group remained, 4,000 parts of deionized water was added, and, then, pressure in the interior of reaction bath was reduced by vacuum pump at 70° C. for one hour so that toluene might be removed, and, thus, there was obtained aqueous solution (D) of ethylenically unsaturated group-containing urethane resin having a solid content of about 40%. Said resin had a number average molecular weight of 2,700, and contained, on average, about two ethylenically unsaturated groups per molecule.

Comparative Production Example 2

A four-necked flask was fed with 600 parts of toluene, 1,200 parts of polyethylene glycol (average molecular weight: about 600) and 666 parts of isophorone diisocyanate, and, then, the resultant mixture was allowed to react at 80° C. for two hours, and, thus, an isocyanate group-containing urethane resin was obtained. Furthermore, 232 parts of 2-hydroxyethyl acrylate and 2 parts of hydroquinone were introduced into reactor, and the resultant mixture was allowed to react at 80° C. for three hours with aeration. After it was confirmed that almost no isocyanate group remained, 3,100 parts of deionized water was added, and, then, pressure in the interior of reaction bath was reduced by vacuum pump at 70° C. for one hour so that toluene might be removed, and, thus, there was obtained aqueous solution (E) of ethylenically unsaturated group-containing urethane resin having a solid content of about 40%. Said resin had a number average molecular weight of 2,100, and contained, on average, about two ethylenically unsaturated groups per molecule.

Example 1

An aqueous liquid composition, which had been prepared by well-mixing 100 parts of aqueous solution (A) of urethane resin of Production Example 1, 2 parts of benzoin isobutylether, 50 parts of distilled water and 100 parts of 2% aqueous solution of sodium alginate, was dripped into 5% aqueous solution of calcium chloride from the tip of syringe which was about 10 cm above liquid surface, and, thus, there were obtained particulate matters having a particle size of about 2 mm. Said particulate matters were placed on a petri dish, which was then irradiated, for 30 seconds, from both upper and under sides with ultraviolet ray emitted from a high-pressure mercury lamp, and, thus, molded particles were obtained.

Example 2

An aqueous liquid composition, which had been prepared by well-mixing 100 parts of aqueous solution (B) of urethane resin of Production Example 2, 1 part of ammonium peroxodisulfate, 1 part of sodium bisulfite, 50 parts of distilled water and 100 parts of 2% aqueous solution of sodium alginate, was dripped into 5% aqueous solution of calcium chloride from the tip of syringe which was about 10 cm above liquid surface, and, thus, there were obtained particulate matters having a particle size of about 2 mm. Said particulate matters were left to stand still as they were at 30° C. for 30 minutes, and, thus, molded particles were obtained.

Example 3

An aqueous liquid composition, which had been prepared by well-mixing 100 parts of aqueous solution (C) of urethane resin of Production Example 3, 2 parts of benzoin isobutylether, 1 part of ammonium peroxodisulfate, 1 part of sodium bisulfite, 50 parts of distilled water and 100 parts of 2% aqueous solution of sodium alginate, was dripped into 5% aqueous solution of calcium chloride from the tip of syringe which was about 10 cm above liquid surface, and, thus, there were obtained particulate matters having a particle size of about 2 mm. Said particulate matters were placed on a petri dish, which was then irradiated, for 30 seconds, from both upper and under sides with ultraviolet ray emitted from a high-pressure mercury lamp, and was then left to stand still at 30° C. for 30 minutes, and, thus, molded particles were obtained.

Comparative Example 1

Molded particles were obtained in the same manner as in Example 1 except that aqueous solution (A) of urethane resin used in Example 1 was replaced with aqueous solution (D) of urethane resin of Comparative Production Example 1.

Comparative Example 2

Molded particles were obtained in the same manner as in Example 2 except that aqueous solution (B) of urethane resin used in Example 2 was replaced with aqueous solution (E) of urethane resin of Comparative Production Example 2.

Test Method

Molded particles of Examples 1 to 3 and Comparative Examples 1 and 2 which had been obtained in the above-mentioned manner were each dipped in culture liquid of denitrifying bacteria. The denitrifying bacteria were thus allowed to adhere to each of the molded particles for two days, and were then subjected to conditioned culturing in artificial waste water for three weeks. Thereafter, by means of batch method (carrier packing rate: 10%; left to stand still at 30° C.), nitrogen-removal rate after three days was measured, and, by means of ATP (adenosine triphosphate) method, the amount of carrier-adhered microorganism cells was measured. Table 1 shows the results.

TABLE 1

| | Amine content in resin (mol/kg) | Amount of adhered cells (nmol-ATP/g-beads) | Nitrogen removal rate (%) |
| --- | --- | --- | --- |
| Example 1 | 0.3 | 0.85 | 85 |
| Example 2 | 0.76 | 0.92 | 90 |
| Example 3 | 1.17 | 1.09 | 97 |
| Comparative Example 1 | 0 | 0.11 | 19 |
| Comparative Example 2 | 0 | 0.2 | 25 |

As is seen in the above results, molded particles which are produced by the method of this invention are excellent in adhesiveness to denitrifying bacteria, and have a markedly improved nitrogen-removal rate.

What is claimed is:

1. A process for the production of molded particles for microbial cell-immobilization which is characterized in that:
    an aqueous liquid composition which comprises:
        (a) an ethylenically unsaturated group-containing hydrophilic urethane resin which is obtained by making tertiary amino group-containing diol (i), which is selected from the group consisting of product (i-1) from a reaction between a diglycidyl compound and a secondary amine which is free of hydroxyl group and product (i-2) from a reaction between a monoglycidyl compound and a secondary amine which has hydroxyl group, react with polyisocyanate compound (ii) so that isocyanate group may exceed hydroxyl group in said diol (i), and further by making thus produced isocyanate group-containing urethane resin (iii) react with compound (v) which has both ethylenically unsaturated group and hydroxyl group;
        (b) a polymerization initiator; and
        (c) water-soluble macromolecular polysaccharides which are capable of gelation by contact with metal ion;
    is gelatinized, in an aqueous medium which contains metal ion, to be particulate gel, which is then subjected to photopolymerization and/or thermopolymerization by which to cause the crosslinking reaction of ethylenically unsaturated group in said particulate gel.

2. A process for the production of molded particles for microbial cell-immobilization which is characterized in that:
    an aqueous liquid composition which comprises:
        (a) an ethylenically unsaturated group-containing hydrophilic urethane resin which is obtained by making tertiary amino group-containing diol (i), which is selected from the group consisting of product (i-1) from a reaction between a diglycidyl compound and a secondary amine which is free of hydroxyl group and product (i-2) from a reaction between a monoglycidyl compound and a secondary amine which has hydroxyl group, react with polyisocyanate compound (ii) so that hydroxyl group in said diol (i) may exceed isocyanate group in said polyisocyanate compound (ii), and further by making thus produced hydroxyl group-containing urethane resin (iv) react with compound (vi) which has both ethylenically unsaturated group and isocyanate group;
        (b) a polymerization initiator; and
        (c) water-soluble macromolecular polysaccharides which are capable of gelation by contact with metal ion;
    is gelatinized, in an aqueous medium which contains metal ion, to be particulate gel, which is then subjected to photopolymerization and/or thermopolymerization by which to cause the crosslinking reaction of ethylenically unsaturated group in said particulate gel.

3. A process of claim 1 or 2 wherein diglycidyl compound is selected from the group consisting of diglycidylether compound and alicyclic diglycidyl compound.

4. A process of claim 1 or 2 wherein diglycidyl compound is selected from the group consisting of ethyleneglycol diglycidyl ether, diethyleneglycol diglycidyl ether and polyethyleneglycol diglycidyl ether which has a number average molecular weight up to 1,000.

5. A process of claim 1 or 2 wherein secondary amine free of hydroxyl group is selected from the group consisting of dialkylamine and alicyclic amine.

6. A process of claim 1 or 2 wherein monoglycidyl compound is a compound which has glycidyl group and ethylenically unsaturated group.

7. A process of claim 1 or 2 wherein secondary amine having hydroxyl group is N-alkylalkanol amine.

8. A process of claim 1 or 2 wherein reaction product (i-1) is obtained from a reaction between a diglycidyl compound and a secondary amine which is free of hydroxyl group, the proportion of secondary amine which is free of hydroxyl group in the reaction being 1.7 to 2.3 moles per mole of diglycidyl compound.

9. A process of claim 1 or 2 wherein reaction product (i-2) is obtained from a reaction between a monoglycidyl compound and a secondary amine which has hydroxyl group, the proportion of secondary amine which has hydroxyl group in the reaction being 0.8 to 1.2 moles per mole of monoglycidyl compound.

10. A process of claim 1 or 2 wherein polyisocyanate compound (ii) is selected from the group consisting of tolylene diisocyanate, 4,4'-diphenylmethane diisocyanate, xylylene diisocyanate, hexamethylene diisocyanate, isophoron diisocyanate, trimethylhexamethylene diisocyanate and dimer acid diisocyanate.

11. A process of claim 1 or 2 wherein, when tertiary amino group-containing diol (i) is made to react with polyisocyanate compound (ii), a part of tertiary amino group-containing diol (i) is replaced with polyol which has ether bond.

12. A process of claim 1 wherein compound (v) which has both ethylenically unsaturated group and hydroxyl group is selected from the group consisting of 2-hydroxyethyl acrylate, 2-hydroxyethyl methacrylate, 3-hydroxypropylacrylate, 3-hydroxypropylmethacrylate, 2-hydroxypropylacrylate and 2-hydroxypropylmethacrylate.

13. A process of claim 2 wherein compound (vi) which has both ethylenically unsaturated group and isocyanate group is ethylmethacrylate isocyanate.

14. A process of claim 1 or 2 wherein ethylenically unsaturated group-containing hydrophilic urethane resin (a) has, on average, at least 1.5 ethylenically unsaturated groups in one molecule.

15. A process of claim 1 or 2 wherein ethylenically unsaturated group-containing hydrophilic urethane resin (a) has a number average molecular weight within a range of 400 to 50,000.

16. A process of claim 1 or 2 wherein ethylenically unsaturated group-containing hydrophilic urethane resin (a) has an equivalent of ethylenically unsaturated group of 50 to 35,000.

17. A process of claim 1 or 2 wherein polymerization initiator (b) is selected from the group consisting of photopolymerization initiator and redox type thermopolymerization initiator.

18. A process of claim 1 or 2 wherein polymerization initiator (b) is a redox type thermopolymerization initiator, one of oxidizing agent and reducing agent of said redox type thermopolymerization initiator existing in the aqueous liquid composition, and the other existing in the metal ion-containing aqueous medium.

19. A process of claim 1 or 2 wherein water-soluble macromolecular polysaccharides are selected from the group consisting of alkali metal salt of alginic acid and carageenan.

20. A process of claim 1 or 2 wherein water-soluble macromolecular polysaccharides are carageenan and wherein metal ion is alkali metal ion.

21. A process of claim 1 or 2 wherein water-soluble macromolecular polysaccharides are alkali metal salt of alginic acid and wherein metal ion is polyvalent metal ion.

22. A process of claim 1 or 2 wherein aqueous liquid composition comprises 0.1 to 10 parts by weight of polymerization initiator (b) and 0.5 to 15 parts by weight of water-soluble macromolecular polysaccharides (c) per 100 parts by weight of ethylenically unsaturated group-containing hydrophilic urethane resin (a).

23. An ethylenically unsaturated group-containing hydrophilic urethane resin which is obtained by making tertiary amino group-containing diol (i), which is selected from the group consisting of product (i-1) from a reaction between a diglycidyl compound and a secondary amine which is free of hydroxyl group and product (i-2) from a reaction between a monoglycidyl compound and a secondary amine which has hydroxyl group, react with polyisocyanate compound (ii) so that isocyanate group may exceed hydroxyl group in said diol (i), and by further making thus produced isocyanate group-containing urethane resin (iii) react with compound (v) which has both ethylenically unsaturated group and hydroxyl group.

24. An ethylenically unsaturated group-containing hydrophilic urethane resin which is obtained by making tertiary amino group-containing diol (i), which is selected from the group consisting of product (i-1) from a reaction between a diglycidyl compound and a secondary amine which is free of hydroxyl group and product (i-2) from a reaction between a monoglycidyl compound and a secondary amine which has hydroxyl group, react with polyisocyanate compound (ii) so that hydroxyl group in said diol (i) may exceed isocyanate group in said polyisocyanate compound (ii), and by further making thus produced hydroxyl group-containing urethane resin (iv) react with compound (vi) which has both ethylenically unsaturated group and isocyanate group.

25. Molded particles which have been produced by the process of claim 1 or 2.

26. Molded particles having microbial cells immobilized thereon, which have been produced by the process of claim 1 or 2.

* * * * *